(12) United States Patent
Maass

(10) Patent No.: US 9,286,124 B2
(45) Date of Patent: Mar. 15, 2016

(54) SIMULATING THE PERFORMANCE OF MEDICAL-ENGINEERING PROCEDURES IN A CLIENT-SERVER ENVIRONMENT

(75) Inventor: Edgar Maass, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 548 days.

(21) Appl. No.: 13/552,173

(22) Filed: Jul. 18, 2012

(65) Prior Publication Data

US 2013/0024498 A1 Jan. 24, 2013

(30) Foreign Application Priority Data

Jul. 19, 2011 (DE) .......................... 10 2011 079 429

(51) Int. Cl.
| | |
|---|---|
| G06F 9/50 | (2006.01) |
| G06Q 10/06 | (2012.01) |
| G06F 11/36 | (2006.01) |

(52) U.S. Cl.
CPC ............... G06F 9/5027 (2013.01); G06F 9/50 (2013.01); *G06F 11/3664* (2013.01); *G06F 2209/503* (2013.01); *G06Q 10/0631* (2013.01)

(58) Field of Classification Search
None
See application file for complete search history.

(56) References Cited

U.S. PATENT DOCUMENTS

| | | | | |
|---|---|---|---|---|
| 4,961,224 A * | 10/1990 | Yung | .................................. | 726/4 |
| 5,630,421 A * | 5/1997 | Barlow | ............... | G01S 7/52026 600/459 |
| 5,978,830 A * | 11/1999 | Nakaya | .................... | G06F 8/456 718/102 |
| 6,591,262 B1 * | 7/2003 | MacLellan | ............. | G06Q 10/06 |
| 6,898,564 B1 * | 5/2005 | Odhner | ............... | G06F 11/3414 703/2 |
| 7,107,187 B1 * | 9/2006 | Saghier | .................. | G06Q 10/06 702/182 |
| 7,149,779 B2 * | 12/2006 | Bocionek | ....................... | 709/206 |
| 7,493,249 B2 | 2/2009 | Tantawi | | |
| 7,565,656 B2 * | 7/2009 | Yamasaki et al. | ............. | 718/104 |
| 7,630,862 B2 | 12/2009 | Glas | | |
| 7,805,496 B2 * | 9/2010 | Aiber | ...................... | G06Q 10/10 709/216 |
| 7,870,256 B2 * | 1/2011 | Talwar et al. | .................. | 709/226 |
| 7,895,261 B2 | 2/2011 | Jones et al. | | |
| 8,069,021 B2 * | 11/2011 | Sturrock et al. | .................... | 703/6 |
| 8,069,245 B2 * | 11/2011 | Bolle et al. | ..................... | 709/226 |
| 8,161,486 B2 * | 4/2012 | Illmann | .................. | G06F 9/5011 718/104 |
| 8,301,286 B2 * | 10/2012 | Babu et al. | ....................... | 700/98 |
| 8,458,680 B2 * | 6/2013 | Crutchfield et al. | .......... | 717/149 |

(Continued)

FOREIGN PATENT DOCUMENTS

WO  WO 03054696 A1  7/2003

OTHER PUBLICATIONS

German priority application No. DE 10 2011 079 429.8 filed Jul. 19, 2011 (not yet published).

*Primary Examiner* — Kibrom K Gebresilassie
(74) *Attorney, Agent, or Firm* — Harness, Dickey & Pierce, P.L.C.

(57) ABSTRACT

Embodiments of the invention relate to a method, system, computer-program product, and/or storage medium for simulating the performance of a medical-engineering procedure which includes performing a multiplicity of applications, with its being intended for the applications to be performed in a multi-client environment in parallel on a plurality of clients. Simulating is based on performing the application in a single-client environment. Runtime and resource requirements are therein measured and fed to the simulating process as input variables. A latency for the runtime and the resource requirements for running in the multi-client environment are fed out as the result of simulating.

14 Claims, 9 Drawing Sheets

(56) References Cited

U.S. PATENT DOCUMENTS

| | | | |
|---|---|---|---|
| 8,498,728 B2* | 7/2013 | Conrardy et al. | 700/98 |
| 8,850,026 B2* | 9/2014 | Glover et al. | 709/226 |
| 8,874,457 B2* | 10/2014 | Biran et al. | 705/7.12 |
| 2002/0087613 A1* | 7/2002 | Harif | 709/104 |
| 2003/0023661 A1* | 1/2003 | Clohessy et al. | 709/104 |
| 2003/0220984 A1 | 11/2003 | Jones et al. | |
| 2006/0161417 A1* | 7/2006 | Hardwick et al. | 703/22 |
| 2006/0179143 A1* | 8/2006 | Walker et al. | 709/226 |
| 2007/0094668 A1* | 4/2007 | Jacquot et al. | 718/104 |
| 2007/0143765 A1* | 6/2007 | Aridor | G06F 9/5011 718/104 |
| 2007/0294681 A1* | 12/2007 | Tuck | G06F 11/3404 717/149 |
| 2008/0005333 A1* | 1/2008 | Bolle et al. | 709/226 |
| 2008/0077929 A1* | 3/2008 | Clohessy et al. | 718/104 |
| 2008/0086731 A1* | 4/2008 | Trossman et al. | 718/100 |
| 2008/0276220 A1* | 11/2008 | Munshi | G06F 8/314 717/119 |
| 2009/0182879 A1* | 7/2009 | Becker et al. | 709/226 |
| 2011/0154355 A1* | 6/2011 | Becker et al. | 718/104 |
| 2011/0191821 A1* | 8/2011 | Pinsky et al. | 726/3 |
| 2012/0150498 A1* | 6/2012 | Shastri et al. | 703/2 |
| 2012/0209625 A1* | 8/2012 | Armstrong et al. | 705/3 |
| 2013/0080142 A1* | 3/2013 | Gangemi et al. | 703/22 |

\* cited by examiner

SIMULATING THE PERFORMANCE OF MEDICAL-ENGINEERING PROCEDURES IN A CLIENT-SERVER ENVIRONMENT

PRIORITY STATEMENT

The present application hereby claims priority under 35 U.S.C. §119 to German patent application number DE 10 2011 079 429.8 filed Jul. 19, 2011, the entire contents of which are hereby incorporated herein by reference.

FIELD

At least one embodiment of the present invention belongs to the field of medical engineering and addresses the issue of enabling predictions to be made about the efficiency and executability of computer-based processes that have been implemented in a multiplicity of computer-based applications in a client-server environment having different requirements and different resources. At least one embodiment of the invention therefore has a background in medical informatics and alongside medical engineering also concerns the field of information technology and relates particularly to a method and a client-server system for predicting or, as the case may be, simulating the performance of a multi-layered medical-engineering procedure in a multi-client environment.

BACKGROUND

Owing not least to cost pressure, in the case of modern medical-engineering systems as many procedures as possible are nowadays being automated through the use of computer implementations. Medical-engineering procedures, for example in medical image processing, are as a rule based on a sequence of steps or applications.

To arrive at a finding it is for example first necessary to load a series of images, relevant images have to be selected from the series of images and enlarged, and medical measurements have to be performed on the image (to determine the volume of a tumor, for instance). Those steps are implemented by running in part different applications. The example just cited is greatly simplified and intended only to explain in a schematic way what for the end user are as a rule hidden background information-technology processes.

Another example is to be found in the controlling of components of a complex medical device such as, say, a computerized-tomography system. What are usually provided for controlling a computerized-tomography or magnetic-resonance-imaging system are control applications that automatically perform presetting operations on the system that are based on environmental parameters, patient-specific parameters, and other input variables. Included here are, for example, controlling the patient table and positioning registration systems (camera, marker systems, etc.). The presetting operations are as a rule performed fully automatically (which is to say without any user interactions).

A plurality of examination devices can also be operated and controlled in parallel depending on the device and medical apparatus. The medical-engineering applications have therein of late been designed as a client-server application. Their performance can be simulated, monitored, and controlled in advance by way of the inventive proposal.

Especially in the field of medical engineering it is absolutely essential to ensure that the applications which are involved are adequate in terms of performance or, as the case may be, efficiency so that they will be able to cope with emergency scenarios, for example. Thus it must be reliably ensured, for example, that a patient can be examined in preparation for an emergency operation. That in turn requires the fundamentals in terms of information technology to be in place. It must be possible for all applications to be run within a maximum permitted runtime with the necessary resources (for example bandwidth of the network, memory resources, CPU capacity utilization, etc.).

For that, it is in turn important to predict the behavior of the participating clients and the server, with the different clients placing different requirements on resources on the server. For configuring the system it is furthermore important to establish after how many clients that may possibly access applications on the server in parallel there will be a slowing-down of the processes or medical-engineering procedure. If a delay of such kind is identified then it will also be important to know what caused it so that possible counter-measures can be taken.

For resolving these matters it was known how to perform tests in the client-server domain that required the deployment of test engineers and manually configured test procedures. The tests were disadvantageously laborious to perform as well as time-consuming and expensive.

Automated tests were therefore introduced in which certain typical error scenarios were modeled for checking whether the medical-engineering procedures were error-free. The automated tests are obviously very complex in their implementation since their quality depends greatly on how well the real client-server environment is modeled. In must in this connection be borne in mind that the medical context is a highly variable one having flexible environmental parameters with extreme requirements being placed on quality. That places very substantial demands on the automated tests performance.

SUMMARY

At least one embodiment of the present invention provides an approach by which configuring the information-technology fundamentals can be improved and made faster. A particular aim is to make it possible to obtain planning information (a prediction) in the real multi-client environment about the entire system's performance. At least one embodiment of the invention can be used for designing a medical-engineering system and/or testing the medical-engineering system before or while it is put into operation or when any changes are made to the system. It should in particular be possible to obtain information about how the system as a whole will behave in terms of time and resource requirements, how a specific client in the system will behave, how many clients are allowed to be active in parallel before a maximum permitted runtime is exceeded, and what resources need to be provided on the server for operating the connected clients. If it is shown that certain maximum permitted thresholds (in terms of, say, runtime or resource requirements) will be exceeded, it should be possible to conduct an analysis so that the reason for the thresholds' being exceeded can be determined.

It must moreover be borne in mind that the medical-engineering procedure requires a series of different, multi-step applications. The series has not been defined and may vary in certain circumstances. That is why it is also desirable to provide an approach by which information can be obtained about the performance of the system as a whole, with the different series of applications (and their respective effect on the overall system's technical behavior) being taken into account.

At least one embodiment relates to a method, a system, and/or a computer-program product (which also includes protection as a storage medium).

One aspect of at least one embodiment of the invention relates to a method for simulating the performance of at least one medical-engineering procedure which includes performing a multiplicity of client-server-based applications, with its being a requirement for the applications in a multi-client environment sometimes also to be run in parallel on a plurality of clients. The method includes:

Performing the medical-engineering procedure, using the applications registered as being necessary, on a reference client having specific reference resources in a single-client environment;

Measuring an actually required runtime and registering the reference resources when the requisite applications are being performed in the single-client environment;

Determining the clients of the multi-client environment, where necessary with their resources;

Simulating the performance of the medical-engineering procedure in the multi-client environment by computing the specific resources of the clients of the multi-client environment that are performing parallel operations using the measured actual runtime and the registered reference resources of the single-client environment in a two-fold iteration comprising a first iteration through time in terms of ascertained resource requirements on, in each case, one client and a second iteration through the specific clients by adding the ascertained resource requirements in, in each case, one time interval;

with a check being carried out during computing and/or within the scope of simulating to determine whether there are sufficient resources on a server to be able to perform steps of the application requiring to be executed in one time interval in each case.

Embodiments of the invention are described below with the aid of the method-specific solution. Advantages, features, and/or alternative embodiment variants mentioned in the description can also be transferred to the other implementations of embodiments of the invention and hence can be applied also to the system, computer-program product, and storage medium. Solutions to corresponding functional features of the method have therein been provided by concrete modules of the system that have the relevant functionality. The same applies vice versa so that features mentioned in connection with the system can also be transferred to the method. Also to be protected, alongside an implementation using hardware, is a software implementation that partially accesses or is based on hardware components and/or other components of the medical-engineering system (for example imaging systems, control systems, etc.).

The terminology employed within the scope of this application is explained in more detail below.

"Simulating" is a term referring to a computer-based prediction of a medical-engineering procedure's performance. Simulating is preferably fully automatic and computer-based. It comprises calculating runtimes and requisite resources. As the term "simulating" suggests, it is inventively unnecessary to actually perform the medical-engineering procedure under examination in the real (multi-client) environment requiring to be tested; instead, information about the medical-engineering procedure's performance can be obtained before a real performance of the same in the multi-client environment. Thus the medical-engineering procedure's performance in the environment requiring to be tested will be simulated before it is performed. The procedure will only be performed in a reference environment. The reference environment is in particular a single-client environment.

The medical-engineering procedure is a medical-engineering workflow which as a rule comprises a plurality of steps. The respective procedure's content is substantially of no relevance to the inventive concept's embodiment. What, though, is preferably to be simulated here are control functions that are embedded in the flow of a medical-engineering system's operations.

Examples of what are included here are configuration and control procedures for medical apparatuses and devices or procedures within the scope of medical-engineering image processing (for example loading or storing copious series of image data in DICOM format). Individual work steps of the procedure can usually be varied in terms of the sequence in which they are performed, while other steps of the procedure have in each case to be executed at a defined instant. That is taken into account in the inventive simulating process.

It is also possible for the procedure to include a hierarchical structure of individual procedural steps—that, too, is taken into account in the inventive simulating process. All possible variations in terms of the medical-engineering procedure (for example alternative work steps and/or a different sequence of work steps of the procedure) can be taken into account in simulating so that a different result can be obtained in performance terms. The medical-engineering procedure is also called a "workflow" depending on the environment.

"Determining the clients" of the multi-client environment preferably includes determining a maximum possible number of clients of the multi-client environment, where necessary with their resources. That means that in the example embodiment of the invention it is established in advance (prior to simulating)—by way of a user input, for example—what the maximum number of clients is that are to be authorized simultaneously for performing the application. In a development, "determining the clients" also includes determining which clients (having which technical parameters and resources) are to be assigned to the multi-client environment so that their technical resources can be ascertained automatically.

The application is usually computer-based or implemented completely as a computer application. The application is as a rule designed for a client-server system and can include server-side and client-side modules. The server-side modules run on the server while the client-side modules run locally on the client or are assigned to it. For performing the application the client accesses the application's server-side modules, with the application being designed for a multi-client environment. That means that an application can also be performed in parallel on a plurality of clients.

For example within the scope of medical image processing in day-to-day clinical operations it is frequently necessary to access medical image data more than once (for example for controlling a sequence of operations or a patient examination, for configuring a device, or for producing a diagnosis specific to a patient). The respective image data is usually accessed via a load application. It should therein in possible for the same image data record to be requested by a first work station and simultaneously by other work stations so that the work stations will perform the relevant load application in parallel.

Depending on how many clients access the respective application and under what conditions, that will have different consequences for the application's efficiency and also place different requirements on the server-side part of the application and on the server itself (in terms of, for instance, resources, memory requirements, processing speed, and transmission capacity etc.). That is where an embodiment of the invention comes into effect so that different scenarios can be tested in advance and measured. The aim in particular is to obtain an advance prediction of the application's performance serving as it were as a "load test". That simulation will make it possible to determine under what usage conditions the medical-engineering procedure can be performed error-free (with no bottlenecks, for example) using the respective applications. A simulated runtime (which is based on a measured runtime in a single-client environment) is for that purpose compared with a maximum permitted threshold runtime. On exceeding of the latter a warning signal indicating an impermissible delay in the runtime will optionally be fed out. An analysis can if necessary be calculated for the bottleneck.

The content of the respective application is basically of no relevance to the idea underlying embodiments of the present invention. The application can include a user interface via which the user can make entries for performing the application. It can otherwise be possible for the application to be performed fully automatically.

The application serves in an example embodiment to control a medical-engineering system (for example a magnetic resonance imaging system etc.) and is embedded in the technical device's flow of operations. The application alternatively serves to register measured values (laboratory values, for example). In another variant of an embodiment of the invention the application serves to register measured values that are specific to a patient or examination and are registered via physical sensors and further processed electronically (for example temperature sensors, location sensors, position sensors, motion sensors, medical measured values, etc.).

A distinction is inventively made between two different application scenarios in performing the application:

A single-client environment; that means that the respective application is performed in each case on just one individual client (what is termed the reference client);

a multi-client environment, where the application is performed in parallel on a plurality of clients. The clients can therein be of the same kind or different (have different resources, for example). It is also possible for the starting point for the runtime on the clients not to be identical but instead for the runtimes on the different clients only to overlap in terms of time. Different requirements will as a result be placed on the application and information-technology platform.

A major aspect of an embodiment of the invention can be found in the idea that the application is initially run only in the single-client environment on just one reference client whose reference resources are known. The runtime and/or resource requirements are in this embodiment measured on the server. More execution-related parameters can alternatively also be registered (for example memory-accessing time, number of accessing operations requiring to be performed in parallel, etc.). When the application has been performed in the single-client environment, the measured actually required runtime and the registered/measured resources of the reference client are supplied as input variables for the simulation calculation. It is furthermore determined which clients in the multi-client environment are to be activated (meaning on which clients the application is to be capable of being executed in parallel). Those variables will also be forwarded as input variables for the simulation calculation.

The simulation module that is designed for performing simulating of the medical-engineering procedure's performance in the multi-client environment can be started immediately or at a later time once all the input variables have been registered. It will be performed by defining a clock frequency—preferably in advance.

The clock frequency thus corresponds to a time interval (for example 0.2 seconds) during which individual steps of the application can be performed. The clock frequency does not, therefore, usually match the processor's or processors' clock frequency in the case of a multi-core system but is related instead to the runtime of an individual step of an application. That has the advantage that simulating can be tailored very precisely and efficiently to the application being tested and does not, for example, lead to intervals that are too short and during which no changes occur owing to the flow of procedural operations.

In an example embodiment variant of the invention, it is provided for the application to be fed during a preparatory phase to a parser whose purpose is to split the application into individual steps or, as the case may be, actions. The actions are usually performed on the client and/or server. There are, of course, possible variations here as regards the sequence of the application steps requiring to be performed. They are preferably taken into account in the simulation. Thus, for example, a first simulation result for a first sequence of application steps can be obtained and compared with a second result for another (different) sequence of application steps in terms of the effects on performance. The sequence of application steps is therefore preferably configurable and/or predetermined.

When the parser module has been executed it will be ensured that the application can be divided into steps during which the resource requirements will be determined. The runtime of an individual action (application step) can, of course, also be calculated. Executing the application in the single-client environment now makes it possible to supply input variables for the simulation process. The input variables include the runtime of the individual application steps on the respective client and/or the respective resource requirements on the server and/or respective client, which is to say the reference client. What technical resources the reference client has (for example main memory, data-transmission capacity, etc.) is already known in advance.

Simulating is embodied preferably by a simulation module. The simulation module is based on a preconfiguration which provides for the individual work steps to be performed on the clients in a sequence determined by way of a random generator. A preconfigurable sequence for performing application steps can alternatively also have been preset here. For each simulation step or, as the case may be, clock frequency the simulation module is able to determine the extent of the resource requirements based on the input variables conveyed to it.

Simulation comprises a two-fold iteration: A first iteration through the clock frequency or, as the case may be, simulation steps and a second iteration through the participating clients (in the multi-client environment). It is therein provided for the participating clients' resource requirements to be added for in each case one time interval. It is thus possible as a result of performance simulating to establish how the individual clients' runtime and/or resource requirements develop in each case in relation to each individual application step or, as the case may be, to the clock frequency. The result is shown preferably in the form of a chart displayed on a user interface. There are various possibilities here. On the one hand the various simulation parameters can be integrated in a chart so that runtimes and resource requirements are plotted against time. It is alternatively possible to display the result in different windows and, for example, to display in one window only the memory capacity utilization over time (clock frequency) and in another chart to show the runtime and/or delays in the runtime in relation to a number of clients. The overall runtime as well as the delay in terms of the runtime will usually increase with the number of clients. The increase is not linear, though. In alternative embodiment variants it is here possible for other technical parameters to be displayed such as, for example, hardware parameters that include a specific hardware configuration of the client and/or server such as, for example, available main memory, external memory, clock frequency, connection of co-processors, etc.

For each individual simulation step a check is carried out within the scope of simulating to determine whether or not sufficient resources are available on the server to be able to perform the individual application step. If sufficient resources are available it will be assumed the application step will be performed without a delay. The simulation module will otherwise allow for a delay time in performing the respective application step.

How high the latency of the runtime was is supplied as an output at the end of the simulation process. It must therein particularly be borne in mind that the delay or, as the case may be, execution latency can be assigned to different reference variables. On the one hand it is possible to supply as an output the delay in each case per application step. On the other hand it is possible to supply as an output the delay in each case per client. Combinations or further reference variables are, of course, also conceivable here. Further supplied as a simulation result is what resource or combination of resources caused the delay (for example main memory, processor, etc.). That means that error conditions can already be analyzed in advance. Further analyses can be carried out based on the simulation values supplied as an output. For example a check can be carried out to determine whether the runtime or resource requirements will be improved if the number of clients is reduced or hardware parameters are modified.

Provision has been made in an example embodiment variant for specifying preconfigurable thresholds which, to determine compliance, are compared with the simulation values calculated during simulating. Thus, for example, a mean delay time can be set and the departures in the simulated runtime can be compared with the mean delay time. It is moreover possible to specify a maximum runtime, with the simulated runtimes calculated by way of the simulation being compared with the thresholds. The threshold runtimes can relate on the one hand to a total runtime or, on the other, to the runtime of individual application steps. It is thus possible to obtain fine-grained information about the behavior of the client-server application or, as the case may be, client-server-based medical-engineering procedure (the granularity of the information can therein be configured).

At least one embodiment of the inventive system thus includes computing the input variables, an operation during which a check is performed to determine whether there are sufficient resources on the server or server group to be able to perform the steps, requiring to be executed, of the medical-engineering procedure's application in one time interval in each case (simulation step). Computing is preferably fully automatic so that the user does not have to enter anything via a user interface. Alternative embodiments here make provision for a user interface via which the user can enter parameters for configuring that are afterwards taken into account during simulating. The simulation result is usually fed out on a user interface; that is done in particular graphically. If required, further windows can also be opened here in which warning advisories, for example, are fed out if preset thresholds are exceeded or not attained.

In an example embodiment variant the method serves to simulate performance and hence includes all parameters characterizing the client-server application's efficiency. In a simple embodiment variant that is at least the runtime. Technical resources can optionally also be taken into account. The technical resources can therein relate both to the client-side components of the application and/or the server-side components of the application. The resources can moreover include the following parameters:
CPU capacity utilization
Memory requirements
Input/output network requirements
Input/output disk accesses
Graphics-card accesses
Accesses to external applications and/or resources.

Let it, though, be noted at this point that to a person skilled in the relevant art it will be obvious that yet further technical parameters can be taken into account. Attention must therein be drawn to the parameters' clearly being technical parameters that either relate to the information-technology platform's hardware (such as, for instance, disk accesses, network bandwidth, etc.) or occupy a lower layer of the ISO OSI layer protocol. It is also possible here in a more complex embodiment variant for technical parameters of the medical-engineering devices to be included such as, for example, position or motion parameters etc. whose values are measured via physical sensors.

In an example embodiment variant of the inventive method the simulation result also includes information about latency, meaning the delay time, while the medical-engineering procedure is being performed in the multi-client environment.

In another variant of an embodiment of the invention the result of the simulation method additionally includes information about possible sources of errors or, as the case may be, error-proneness while a procedure is being performed in the multi-client environment. A particular advantage of that is that possible sources of errors can be indicated automatically in advance. It can thus be established, for example, even before practical use has commenced that the hard disk is the bottleneck and that serious errors will be caused by the bottleneck when the design of the client-server structure is as planned. With the aid of this invention it will hence be possible to make specifically targeted investments in advance or make selective modifications to improve performance.

A major feature of an embodiment of the invention is that the respective application is performed on the reference client which serves as a single-client environment. It is therein essential for the technical parameters of the reference client and the requirements it places on the resource requirements to be known on the server so that the measured runtime can be assigned to the client's respective parameters so as to be taken into account during simulating. The method usually includes performing the application on a reference client. It is, of course, also possible here to provide a group or grid of reference clients whose technical resources are known.

As already mentioned above, not only a runtime or, as the case may be, delay time can be supplied as the result of the simulation method while a procedure is being performed in the multi-client environment. The resource requirements in preconfigurable time intervals can alternatively be additionally ascertained. The simulation step is therein the smallest selectable time unit.

In an example embodiment variant a further analysis step will be performed if impermissible delay times or non-existent resource requirements are determined. The analysis step includes an analysis of possible sources of errors. It can moreover be followed by further statistical evaluations aimed at, say, determining more precisely by which resource or resource group the bottleneck was caused and whether the bottleneck had already been registered in earlier simulation passes as a source of errors. It is furthermore possible for a general statistical evaluation of the possible sources of errors involved to be fed out.

An advantageous, more complex embodiment of the analysis includes at the same time a proposal for improving performance if a cause of errors could be clearly identified. For example the proposal can include an expansion of the client's and/or server's technical resources or capacity.

According to another aspect, the application includes a specific sequence of application steps that is sometimes able to be modified. A particular advantage is that simulating takes different sequences of application steps into account so it can be established, for instance, that the application performs better with sequence of steps A, B, C than with sequence of steps B, A, C.

Another aspect of an embodiment of the invention is that different applications can in turn be performed in different sequences for performing the medical-engineering procedure. The medical-engineering procedure can thus also be performed in the sequence of applications A1, A2, A3 and in the sequence A2, A1, A3, for example. Here, too, the advantage of the simulation method can be seen in the possibility of also taking different sequences of applications into account in simulating the medical-engineering procedure.

The duration of the time interval for a simulation step can according to one aspect be configured in advance. The advantage of that is that the simulation method can be performed more on a fine-mesh or coarse-mesh basis of varying granularity. Hierarchically structuring a medical-engineering procedure into different sequences of applications and structuring a respective application into different sequences of application steps, with their respectively being taken into account during the simulation process, will allow simulating to be kept very flexible.

According to one aspect of the invention, the method includes at least the following input variables:

The medical procedure with the requisite applications;

A sequence of application steps of the requisite application;

A number of clients in the multi-client environment that perform the application in parallel;

Resources of the clients and server in the multi-client environment;

Measured runtime and measured or, as the case may be, specified resources for performing the application in the single-client environment;

Duration of a time interval (simulation step) and, optionally,

A maximum threshold for the medical-engineering procedure's runtime. Individual thresholds for performing the individual applications can, of course, also be specified.

According to another aspect of the invention, the method includes at least the following output variables which, if necessary, can be assigned to the steps of the application:

All or selected input variables as information for the user (optional);

A simulated average runtime of the medical-engineering procedure and, optionally, a simulated average runtime of the individual applications;

A latency time;

Warning advisories when thresholds and/or limits are exceeded;

Analysis of the simulation;

Comparison with earlier simulations and, where applicable, statistical evaluating;

Evaluating possible performance limitations.

What can basically be said about the application's client-server architecture is as follows. When the application is running on a client, the client accesses the application's server-side components and hence the server. The requirements placed thereby on the server are inventively (and possibly in addition to the resource requirements on the client itself) registered and assigned to the accessing/requesting client application. Thus what can advantageously also be obtained as a simulation result is (at what instant) which client places what (resource) requirements on the server or, as the case may be, induces them.

A system is also provided for simulating the performance of at least one medical-engineering procedure, with the procedure comprising running a multiplicity of client-server-based applications. It should be possible for the applications to run in parallel on a plurality of clients in a multi-client environment. Simulating serves to enable information about performance capability in the multi-client environment to be obtained in advance (meaning even before the procedure and application are run) so that possible sources of errors and bottlenecks can be determined beforehand.

The system therein includes a multiplicity of clients, with at least one client serving as a reference client in the case of which reference resources for running in the single-client environment are known or, as the case may be, can be specified. The reference resources can be specified automatically or by making entries via a user interface. When specified automatically, the reference resources can be read from data sheets. The system furthermore includes at least one server or a server cloud and corresponding network connections between the individual computer-based instances. The system furthermore includes a simulator (also called a simulation module) intended to simulate the performance of the medical-engineering procedure in the multi-client environment. The simulator includes a computing module embodied for simulating the runtime of the medical-engineering procedure and its resource requirements when it is running in the multi-client environment.

The simulator and/or computing module can be partly or completely embodied on one of the clients and/or on the server depending on the specific embodiment variant. It is moreover possible for the simulator and/or computing module to be provided in a separate, external computer-based instance. That will prove to be particularly advantageous if an external control computer is to be provided. The runtime is registered preferably on the client or, as the case may be, reference client. The measuring device for registering the runtime is therefore preferably implemented on the reference client. The resource requirements are preferably ascertained on the server. The resource-specifying device, whose intended purpose can also be to register the resource requirements (which are induced/requested by the respective client) on the server, is therefore preferably implemented on the server.

A computer-program product is also disclosed. The computer-program product includes a computer-implemented simulation method as described in the foregoing along with information-technology modules that can be assigned as and when required such as, for example, program libraries, IT structures, hardware topologies, or software topologies. Protection is therefore also to include the computer program which can also be stored on a storage medium so that protection extends also to the storage medium and the simulation method stored thereon.

As already explained above, an embodiment of the invention thus relates to planning, controlling, and realizing automation solutions in medical engineering. In particular computer programs, individual program structures, hardware elements, and communication topologies can therein be combined for the technical process. It should therein be borne in mind that the inventive method and proposal are performed on a technical device which includes computer-based instances. Both the simulation method and the medical-engineering procedure requiring to be simulated are based on technical devices, equipment, or systems such as, for example, controls, stored-program controls, process computers, industrial computers, and medical-engineering devices.

BRIEF DESCRIPTION OF THE DRAWINGS

The above-described characteristics, features, aspects, and advantages of this invention as well as the manner in which they are achieved will become clearer and made easier to understand in conjunction with the following description of the exemplary embodiments, which are explained in more detail in conjunction with the drawings.

Figure 1:
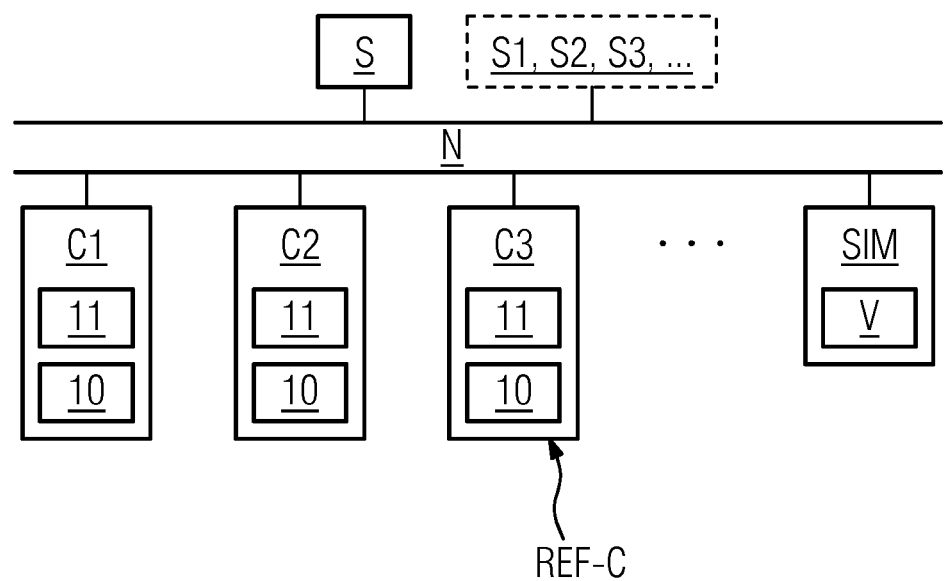
FIG. 1 is a schematic overview of a client-server architecture on which client-server-based applications are to run and whose performance will be simulated in advance.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows in schematic, simplified form a client-server-based automation system that is designed for running different computer-based modules and methods and includes a multiplicity of computer-based instances and/or modules that exchange data with each other via a network N.

In the principal embodiment variant of the present invention the applications that are to run on the client-server system have a medical background so they are medical-engineering applications such as, for example, loading images into a 3D viewer. The subject matter of the application is not, though, limited to the field of medical engineering, its rather being the case that the simulation process can just as well be applied to other areas such as simulating production processes and processes used in production systems requiring different computer-based applications to be run.

As shown in FIG. 1, as a major constituent the client-server architecture includes a server S. Server S can be connected as a separate computer or as a separate computer-based instance of the platform. That is identified in FIG. 1 by the box having an unbroken outline and bearing the reference letter "S". Server S can alternatively also be formed by way of a server farm comprising a multiplicity of servers. That is identified in FIG. 1 by the box that has a dashed outline and bears the reference numerals/letters S1, S2, S3 and serves to identify servers of a server farm that are in each case connected together. Alongside server S, as major constituents the client-server architecture includes a multiplicity of clients C1, C2, C3, . . . which for their part exchange data with server S via a network N and as and when required can also exchange data with each other. The client-server architecture is furthermore assigned a simulation module SIM which in turn includes a computing module V. The simulation module (also called a simulator) likewise exchanges data with the other computer-based instances of the client-server architecture via network N.

Figure 11:
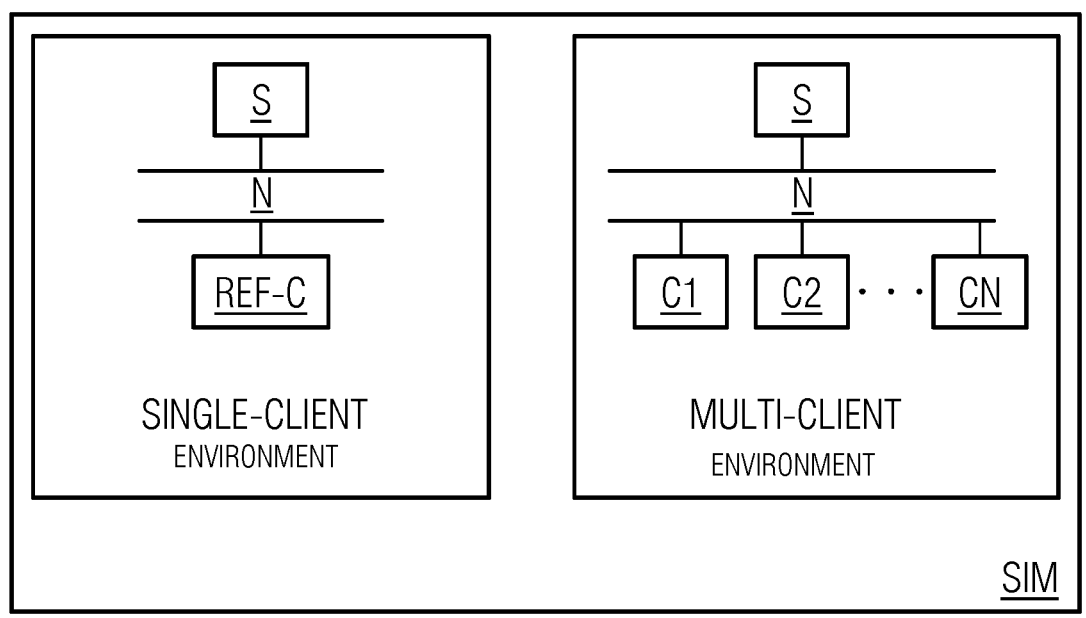
FIG. 11 is a schematic of a single-client environment and a multi-client environment.

In FIG. 11 it is shown schematically that a distinction is made between two different environments in performing the inventive simulation method according to an example embodiment variant:
1. A single-client environment in which a reference client REF-C is provided on which the medical-engineering procedure and/or the applications are called up (they run partially on server S).
2. A multi-client environment that comprises a multiplicity of clients C, with its being possible for the respective application to run in parallel on a plurality of clients in the multi-client environment.

The single-client environment and multi-client environment are taken into account during simulating by simulation module SIM. If, for example, a medical-engineering procedure P is to be checked for performance, with its being provided for individual applications A of medical-engineering procedure P to run in parallel on a plurality of clients C1, C2, Cn, then an embodiment of the inventive simulation method can be used for generating a prediction of the runtimes and resource requirements in the multi-client environment based on the measured runtimes and measured or, as the case may be, registered resources in the single-client environment. Clients C thereby acting in parallel can have the same structure or, as the case may be, different structures. If, for example, an image data record is to be loaded so it can be shown in a 3D viewer, then a multiplicity of applications will have to be run. It should, though, therein be possible for the procedure P (loading the image-data record for displaying on a 3D viewer) to be run in parallel on a plurality of clients C1, C2, . . . . Running it on a plurality of parallel clients having in part different resources will result in a change in performance (runtimes and resource requirements). A prediction of the change in performance (preferably including server-side and client-side components) is inventively provided automatically.

According to one aspect of an embodiment of the invention, the simulated behavior of the client-server-based application or, as the case may be, overall client-server-based medical-engineering process is ensured by specifying in advance a reference client REF-C whose resources are registered (preferably automatically). That can usually be done by reading in relevant data, for example manufacturer's data from the data sheet provided by the company that manufactured the medical-engineering device. Reference client REF-C can be selected from the set of available clients C1, C2, . . . , Cn and serves as a reference client for running the requisite applications or requesting a run of the requisite applications on server S.

For that it is necessary in a parsing pass for respective medical-engineering procedure P to automatically identify which applications A are required for running medical-engineering procedure P. It is usually a sequence of applications A1, A2, A3, . . . Ai.

Figure 10:
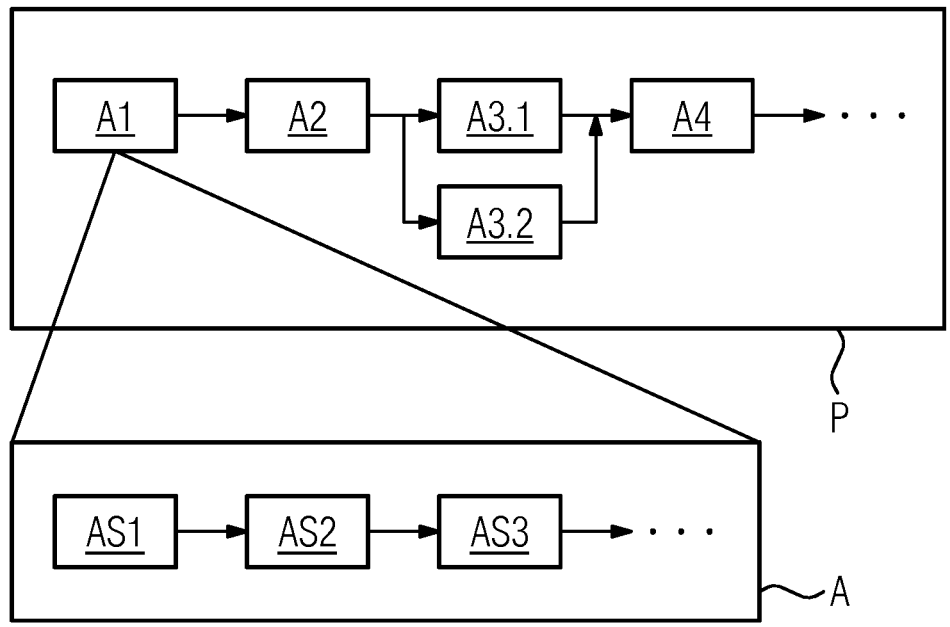
FIG. 10 is a schematic of a medical procedure with applications and application steps.

The hierarchical structure of medical-engineering procedure P is briefly explained below in conjunction with FIG. 10. Medical procedure P comprises a sequence of applications identified in FIG. 10 by the rectangular boxes bearing the reference numerals/letters A1, A2, A3.1, A3.2, A4, . . . . A plurality of applications can therein also be run in parallel, or other forms of time overlapping will occur while the applications are running.

Each of applications A is for its part hierarchically structured and comprises a sequence of application steps AS1, AS2, AS3, . . . . It will of course be obvious to a person skilled in the relevant art that individual application steps AS and/or individual applications A may here also be subject to recursions, iterations, or parallel runs. The structure shown in FIG. 10 is therefore to be understood only as a rough scheme whose implementation in practice will exhibit departures.

According to an example embodiment variant it is provided for the simulation system to include a specification module embodied for automatically specifying an as optimal as possible sequence of application steps AS within the application and an as optimal as possible sequence of applications A within medical-engineering procedure P. The sequence of application steps AS and/or the sequence of applications A can also have been preconfigured. It must therein be emphasized that changes can be made to the preconfiguration and also taken into account during simulating. Thus it is particularly advantageous that the simulation method will also simulate deviating sequences of application steps AS and/or of applications A. The simulation results can accordingly be mutually compared with respect to different sequences of applications A and/or application steps AS in order to achieve the best possible performance for the system as a whole.

It is usually provided for there to be a data structure filed in which is an allocation table containing allocations between in each case a medical-engineering procedure P and a (preconfigurable) sequence of applications A (in turn containing a sequence of application steps AS). It can therefore be automatically identified which applications are necessary for running the respective medical-engineering procedure (which is to be simulated).

The sequence of applications A that have been identified as necessary will be run in the single-client environment once the aforementioned preparatory steps have been carried out. The runtime actually required will therein be measured on reference client REF-C and server S and the resources present will be automatically registered on reference client REF-C and server S.

Figure 3:
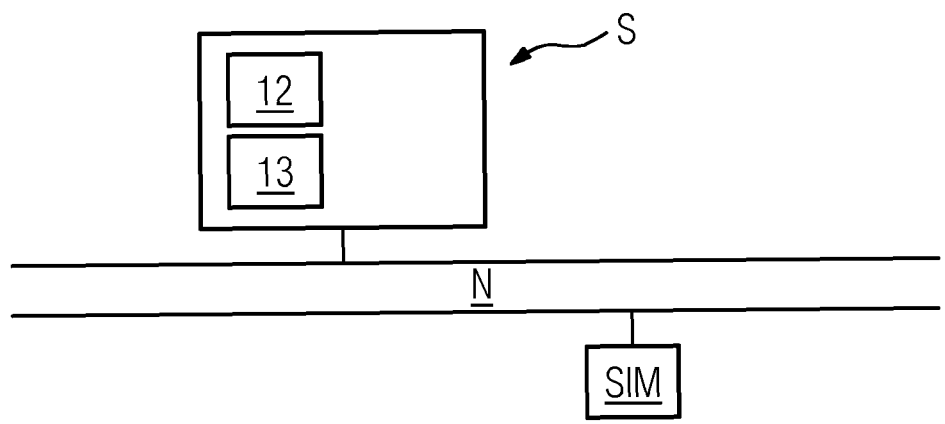
FIG. 3 is an overview of other components of the servers.

In FIG. 3 it is shown schematically which modules or, as the case may be, components are necessary on reference client REF-C for running application A in the single-client environment. Reference client REF-C is used in the single-client environment to make the respective application or, as the case may be, the sequence of applications A run on server S. The runtime and resource requirements are therein measured on reference client REF-C. That is done via a measuring device 12 (referred to also as a "performance counter") serving to register the runtime. Also used is a resource-specifying device 13 serving to automatically specify the resources of reference client REF-C. It can be a read-in module that automatically extracts the relevant resource variables from specifically formatted data sheets. The resources are predominantly hardware resources 11 and general or other technical resources 10 (for example sensors, interfaces, adapter devices, etc.).

As also shown in FIG. 1, each client C therefore includes hardware resources 11 and other technical resources 10.

According to an example embodiment variant it is provided for respective hardware resources 11 to be divided into classes and defined in terms of their grade. Thus, for example, a first class of hardware resources can be defined having grade 1 and including a specific combination of hardware resources (memory requirements, CPU, network linking, etc.), while a second class of hardware resources can be defined that is equipped, for example, with fewer or more resources. As described above, the general or other resources are technical resources that include, for example, the CPU capacity utilization, the memory requirements, the network-requirement parameters, disk accesses, graphics-card accesses or requirements or, as the case may be, accesses to external resources.

As also described above, the runtime and resource requirements when respective application A is running are registered on reference client REF-C and/or server S in the single-client environment. The registered variables or, as the case may be, values are then automatically forwarded to simulation module SIM for simulation purposes. Further metaparameters (for example metaparameters relating to the run situation such as, for example, a low load at night or a high load due to an emergency operation on a patient) can of course be taken into account here.

Figure 2:
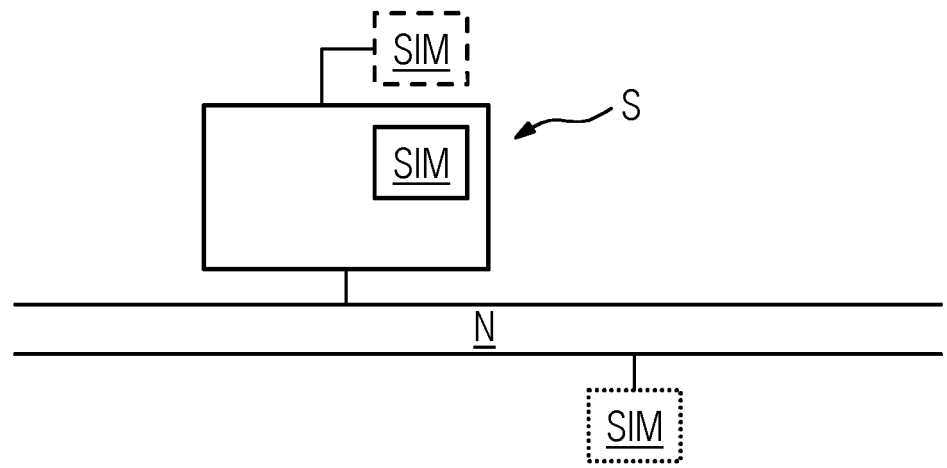
FIG. 2 is a schematic overview of how a simulator that is assigned to a server is provided.

It will be shown in the following with reference to FIG. 2 that simulation module SIM can be provided in different ways. One way is to implement simulation module SIM on server S. That is shown in FIG. 2 by the cross-section with an unbroken outline and the rectangular box bearing the reference letters SIM. Simulation module SIM can alternatively also be connected to server S as a separate instance and provided so to speak as an external component. That is shown in FIG. 2 by the dashed outline. Simulation module SIM can alternatively also be provided on the client side or located directly on one of clients C. That is indicated in FIG. 2 by the box with a dotted outline. Combinations of the above-described implementation alternatives of course also fall within the scope of this invention. An advantage of an embodiment of the invention is that simulation module SIM can run on any client and that no special or enhanced requirements need to have been met as regards information-technology parameters. Thus simulation module SIM can readily run on a Windows computer, for example.

Figure 4:
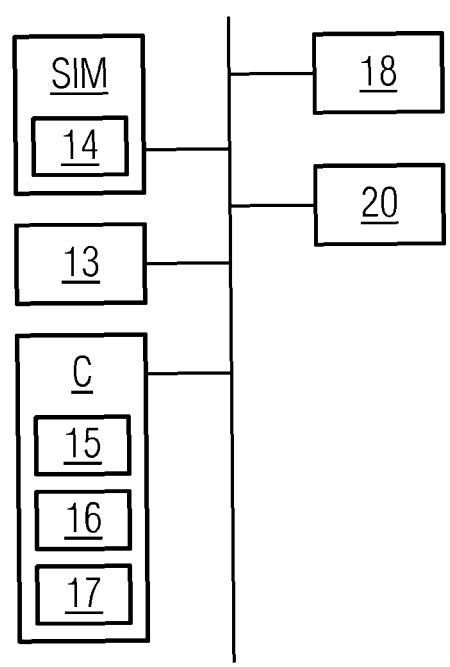
FIG. 4 is a schematic of individual computer-based instances that can be used according to an example embodiment variant of the inventive method.

It will be described in the following with reference to FIG. 4 which modules are necessary in performing the simulation process. Firstly, of course, it is simulation module SIM that can include a procedure and application serializer 14. It serves to specify the sequence of application steps AS and the sequence of applications A and/or read them in from preconfigured values. Also required are resource-specifying device 13 and client C. Client C includes an application-class serializer 15 whose function is to specify and/or manage the sequence of applications and/or application steps. Both the procedure and application serializer and the application-class serializer 14, 15 can be based on an XML file. Client C furthermore includes a property module 16 and a method module 17 for defining properties and methods of application A requiring to be run. Also provided is a hardware-class-determining device 18 that can likewise include an XML file in which in the respective clients of the multi-client environment are classified and determined in terms of their technical parameters (CPU, memory, accesses, connected processors, etc.). Further provided is an application-step manager 20 that serves to monitor and manage the sequence of individual application steps AS and/or also the sequence of applications A overall.

Figure 5:
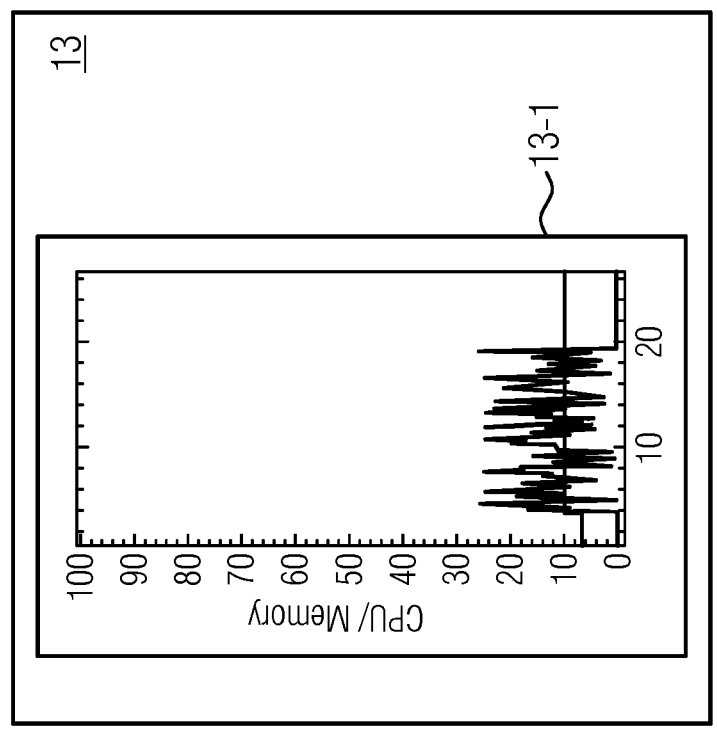
FIG. 5 is an example presentation of measured runtimes and measured hardware resources.
Figure 5:
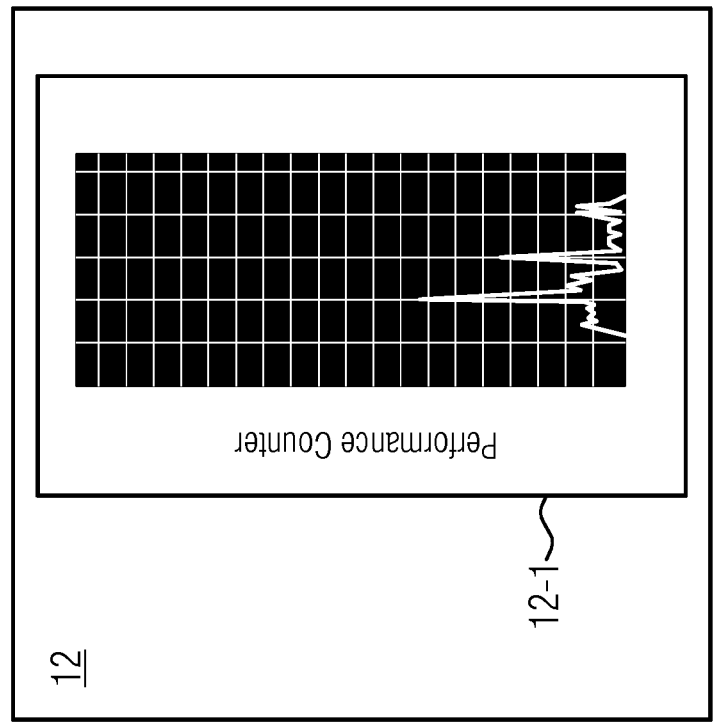

The structure and a possible user interface of measuring device 12 and resource-specifying device 13 are presented in the following in conjunction with FIG. 3. As shown in FIG. 5, measuring device 12 includes at least one measuring device for registering the runtime when respective application A is running on reference client REF-C in the single-client environment. The runtime is therein measured by way of performance counter 12-1 and displayed graphically. Resource-specifying device 13 furthermore includes a graphical representation of the ascertained or, as the case may be, measured resource requirements (shown here—CPU and memory requirements: CPU/Memory) relating in an embodiment of the invention to server S (the resource requirements can alternatively as and when needed also be ascertained additionally on client REF-C). The representation of the resource requirements is identified in FIG. 5 by the reference numerals 13-1. Representations 12-1 and 13-1 both include a graphical representation over time.

Figure 6:
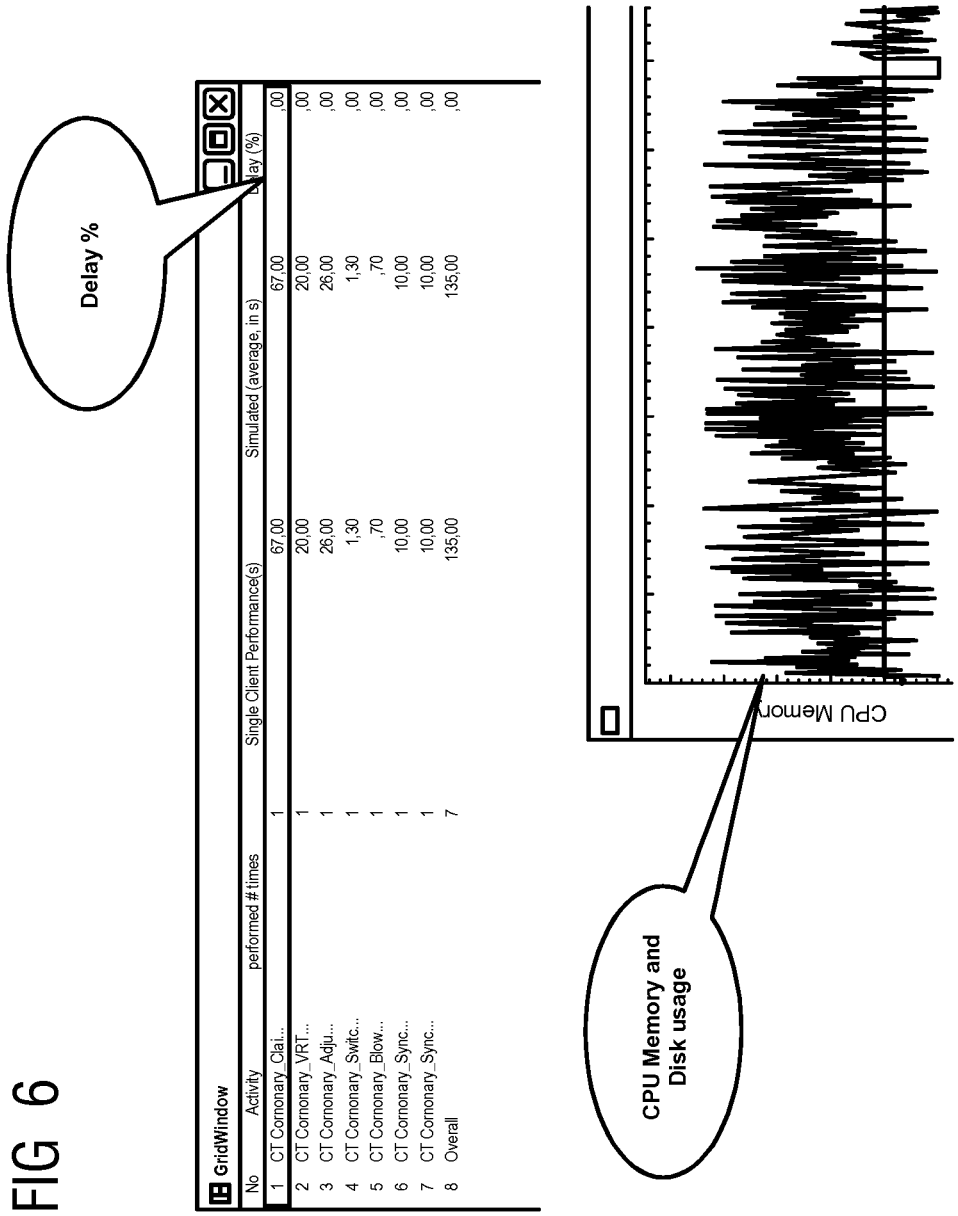
FIG. 6 is an example presentation of parts of a user interface for feeding out results or partial results of the simulation method comprising delay information and a plotting of resources against time.

A user interface of inventive simulation module SIM is shown by way of example in FIG. 6. Simulation module SIM thus also includes a user interface for presenting the simulation result. The result is therein usually presented in different windows. As shown in FIG. 6, an upper window can be provided in which the respective application step (referred to as "Activity" in FIG. 6), a number of runs, details of the measured runtime in the single-client environment ("Single Client Performance(s)"), and an average simulated runtime for the run in the multi-client environment ("Simulated (average, in s)") are fed out. The above-described window can optionally also include a delay component serving to present the delay time ("Delay"). The resulting advantage is that the user will be able at a glance, so to speak, to see a percentage delay in running the scheduled application in the multi-client environment under the respective conditions (inter alia the number of clients and how they are equipped, as well as resource requirements/server).

In the lower window of the user interface shown in FIG. 6 is a graphical representation of the resources over time. The CPU and memory requirements are in that example plotted against time (CPU Memory and Disk usage). It is therein fundamentally possible to combine different technical resources in a graphical representation or to display each individual technical resource in a separate, individual window (in graphical form, for example, plotted over time). Also possible is a curtailed thumbnail representation simply indicating whether the simulated variables (in this case performance and resource requirements) are or are not within a permissible range.

Figure 7:
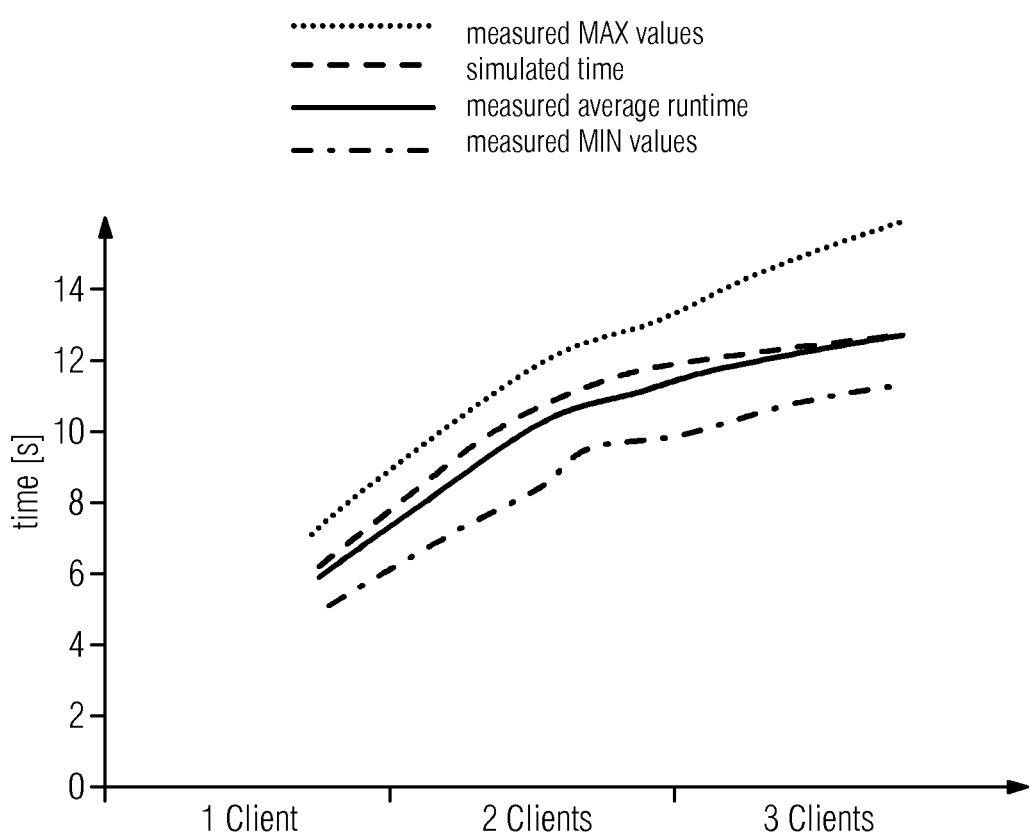
FIG. 7 is a graphic presentation of a simulated runtime, a measured average runtime, and measured maximum and minimum values for a variable number of clients.

The result of the simulation process moreover usually includes an output of the respective runtimes with a varying number of clients mutually compared. That is shown in exemplary fashion in FIG. 7. The measured average runtime of an application A on reference client REF-C is shown in FIG. 7 by the unbroken line. The dashed line shows the simulated runtime for performing application A in the multi-client environment. The bottom (dot-dash) line and top (dotted) line show respectively the measured minimum values and measured maximum values for the runtimes (preconfigurable). A distinction has been made in FIG. 7 between a single-client environment (one client), a two-client environment (two clients), and a multi-client environment with three clients. A person skilled in the relevant art would advantageously recognize at a glance, so to speak, how the runtimes and resource requirements will change (or, as the case may be, increase/worsen) when further clients are added in the multi-client environment.

In another embodiment variant of the invention it is provided for the simulation result to include further details such as, for example, a statistical evaluation of the simulated values. The simulated runtime can therein be compared with, for example, reference runtimes or runtimes performed, measured, or simulated at an earlier time. The same also applies to the resource requirements. Other comparison operations (for example with preconfigurable thresholds) are also possible. A major advantage of an embodiment of the invention is that simulation module SIM additionally includes an analysis module (not shown in the figures) serving to analyze the simulated values in a configurable manner. A possible cause of errors or, as the case may be, a cause for restricting the simulated performance can thus be ascertained for example automatically. Once a bottleneck has been identified in the client-server architecture, appropriate remedial action can be devised through accessing a database. For clearing the problem, the database contains proposals (usually a combination of individual measures) relating to typical scenarios or, as the case may be, typical errors. For example if a shortfall is determined in meeting the memory requirements it is possible here to propose connecting a co-processor or adding an external memory.

Figure 8:
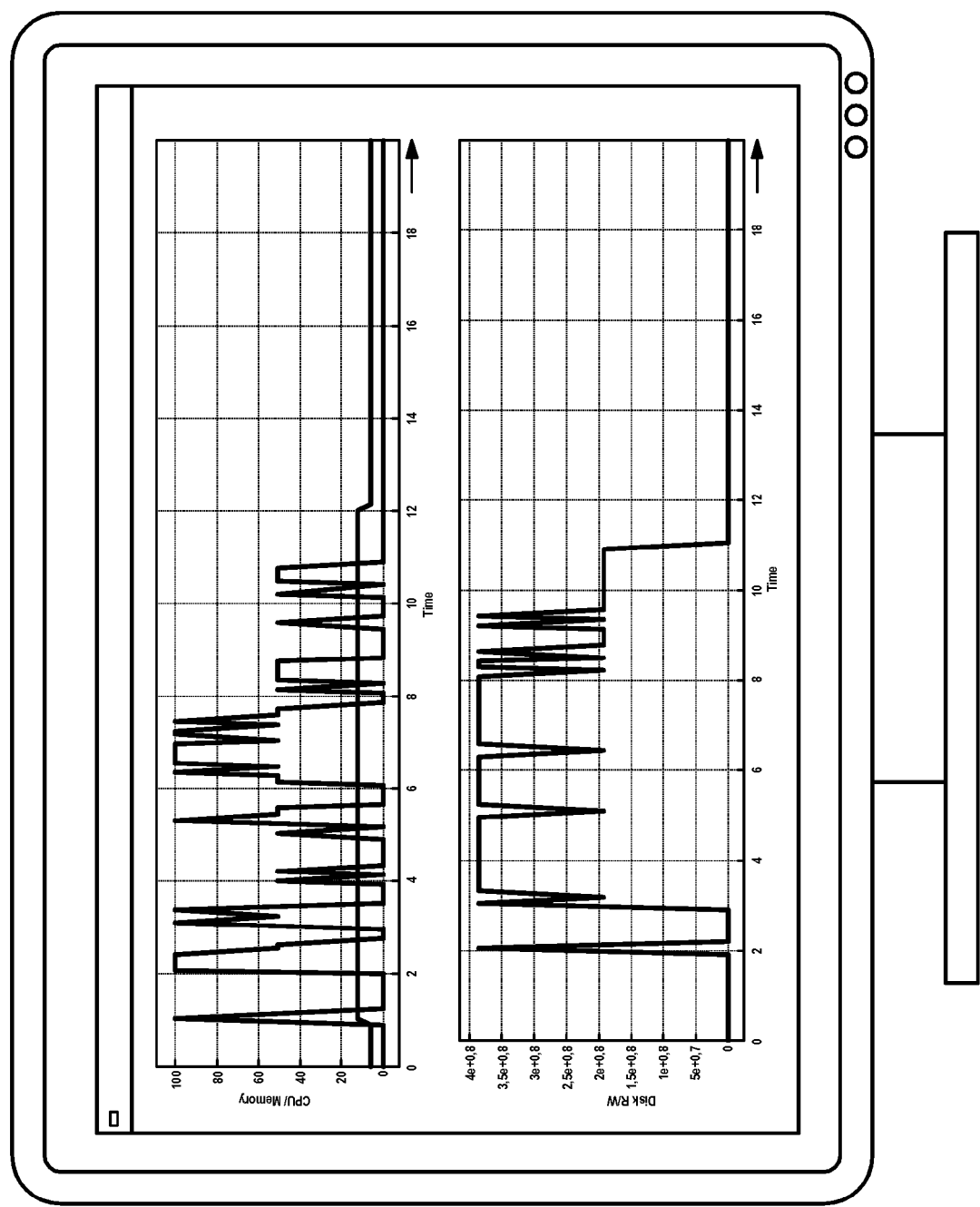
FIG. 8 is an example presentation of a simulation result with a presentation of memory accesses and resource usage over time.

Another way to present the simulation result is described in FIG. 8. Shown therein in a window are two graphs in which the resource requirements (in this case Disk R/W accesses and CPU/Memory) are plotted against time. At a glance, therefore, the user is given information about the instant at which there were increased memory requirements and/or an increased CPU load during the application's run. Remedial measures can be initiated automatically if the simulated runtime and simulated resource requirements exceed a predefined maximum threshold.

Figure 9:
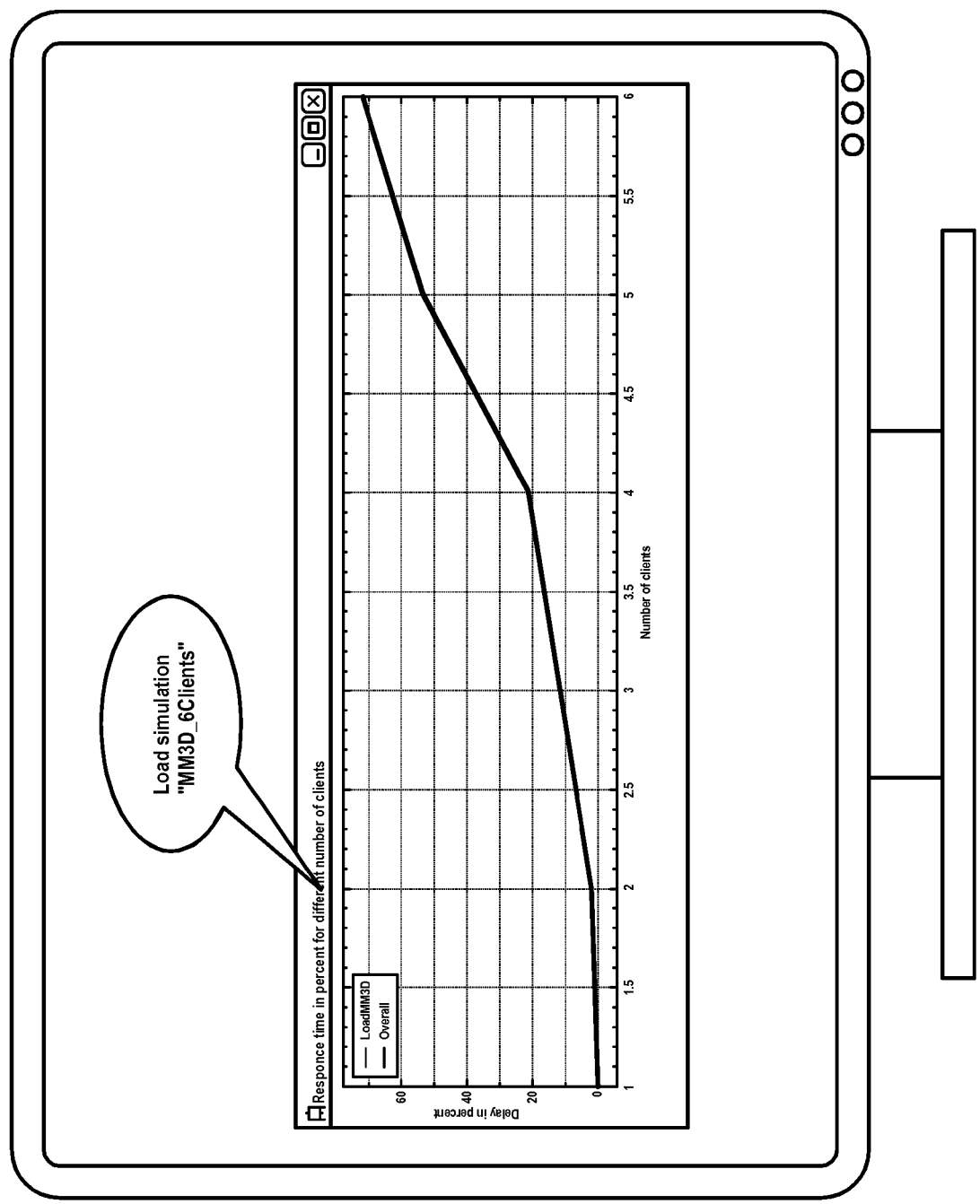
FIG. 9 is an example presentation of the simulated runtime for different numbers of clients for an exemplary application ("Load MM3D")

FIG. 9 shows an example presentation of the simulated runtimes or, as the case may be, response times as a percentage for a different number of clients for running the example application "MM3D_6 Clients". The delay time is therein plotted across the number of clients as a percentage. Although it is an obvious fact that the overall runtime will be longer when the number of clients is increased, simulating will enable more precise information about that to be obtained and in all also make it possible to specify a maximum permitted number of clients letting the respective application run in parallel on server S without the runtimes and resource requirements overstepping impermissible limits. As shown in FIG. 9, the relevant curve is not proportional.

An embodiment of the inventive solution advantageously also makes it possible to ascertain interdependencies between the individual clients as regards overall performance (including runtime and resource requirements). That is achieved by the simulation algorithm by way of the two-fold iteration.

An example flow according to an example embodiment variant of an embodiment of the invention is described in more detail below with reference to FIG. 12.

Once the simulation procedure has started, the following measures are performed at step 1:

Specifying application A for medical-engineering procedure P and its sequence.

Specifying application steps AS for respective applications A and their sequence.

Step 2:

Specifying the technical resources of reference client REF-C that serves to run the respective application in the single-client environment.

Step 3:

Running application A in the single-client environment on reference client REF-C.

Step 4:

Measuring the runtime on reference client REF-C.

Specifying the resource requirements that arise while application A is being run by reference client REF-C on server S. The resource requirements arising on the respective client can where applicable also be ascertained in addition.

Step 5:

Specifying clients C for running the application in the multi-client environment. So this is where the clients on which respective application A is to run in parallel are specified.

Step 6:

Specifying the performance for running application A in the multi-client environment.

Step 7:

Checking: Have all applications A for medical-engineering process P been executed? A case differentiation takes place here depending on the result. If the preceding check has indicated that not all applications A have been executed yet, then branching will take place to the branch shown on the left in FIG. 12. A branch is therein made to the next, following application A within the specified sequence of applications A and steps 3 to 6 will be performed for application A following next. Steps 3 to 6 are thus performed iteratively for all applications A in the specified sequence of applications. The simulation process will terminate if the check performed at step 7 showed that applications A in the specified sequence of applications have all been executed.

Figure 12:
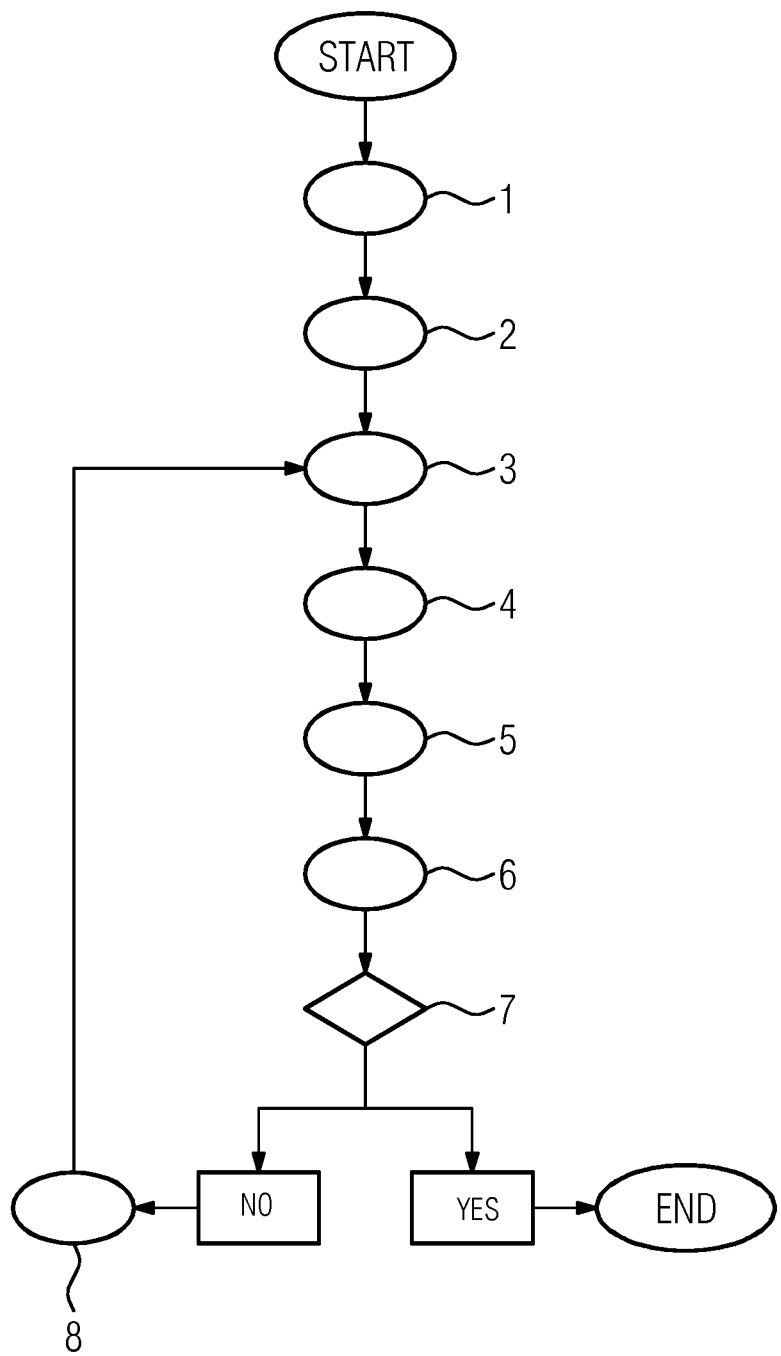
FIG. 12 is a flowchart of the simulation method according to an advantageous embodiment of the invention.

It is of course obvious that the sequence of method-related or, as the case may be, simulation steps shown in FIG. 12 is not fixed and can be varied as and when required. Thus it is possible, for example, for steps 1 and 2 to be performed during a preparatory phase, the advantageous consequence of which will be that simulating will produce a result faster if the input variables are already established. It is also possible to perform step 2 at a later time, say after step 3.

According to an example embodiment variant, step 6 itself includes an iteration while performance is being simulated. That relates to iterating over time. It is therein preferably provided for a simulation step to be defined ahead of simulating as a time interval (two seconds, for example). Once medical-engineering process P has been split into a sequence of applications and a sequence of application steps AS, it is iteratively determined how long the runtimes are at the respective simulation step. That is done for each simulation step.

Inventive simulating is thus based overall on two-fold iterating: Firstly across the simulation steps or, as the case may be, respective applications and then across participating clients C. The resource requirements of the clients performing access operations in parallel for the respective application step are therein added.

Simulating basically serves to predict the technical behavior of a client-server-based application structure. What is particularly to be predicted is how the program structure will behave if a plurality of clients C access all or selected parts of the program structure or, as the case may be, cause them to run on server S simultaneously or, as the case may be, in parallel. Runtime and resource consumption will increase as the number of clients C increases. It is not, though, possible to make a blanket statement about the specific nature of that increase or what restrictions there may be over time. That necessitates complex and extensive measurements and calculations that are performed automatically by way of simulation module SIM and computing unit V.

An embodiment of the invention is based substantially on an application A or, as the case may be, a sequence of applications A initially being run only in the single-client environment on one reference client REF-C. Runtimes and resource consumption are therein measured (preferably on reference client REF-C and server S respectively). The measured values are then fed to the simulation process so that it will be possible to simulate complex application scenarios for example when specific application steps are to be performed in parallel on different clients (having in part different resources). The simulation result includes the output of a delay time (latency) and the resource requirements, and, where applicable, an assignment to a specific resource as the cause of the latency can be determined automatically as can further trouble-shooting measures.

Clocking of the simulation process is preferably variable. A time interval for the duration of the simulation step will then be specified in advance.

If, in the following example, respective application A has been specified for loading an image-data record, then when the loading process is being performed on a selected reference client REF-C its run duration will be measured (for example 6 seconds) as will the main-memory requirements (for example 1 GB), the processor's load on the server during that time (for example 15%), and a hard-disk data rate (for example 1 MB/s). The technical parameters (meaning the reference resources) of the server (and/or reference client REF-C) such as, for example, main memory on the server: 16 GB, maximum data read rate: 100 MB/s are entered or read in before or afterwards. When it has furthermore been specified that up to 5 clients C are to be able to load the image data record simultaneously, simulating indicates that the latency time during simulating is two seconds. That means reckoning with a delay of two seconds if the specified 5 clients C load the image data simultaneously (as compared with loading the image-data record from just one client). Simulating furthermore indicates as the cause of the increased latency time that the hard disk has been insufficiently dimensioned and is unable to load the images as quickly as necessary. Troubleshooting measures can now advantageously be applied automatically.

A particular advantage is therefore that it can be established in advance (so before the respective application is run and while the client-server system's information-technology parameters are still being defined) whether the client-server system, platform, and respective architecture have been adequately dimensioned and designed. Errors can therefore be identified early and obviated without the applications' having to be specifically run in the multi-client environment. Inventive simulating thus serves to control and design the client-server system's technical architecture. Significant cost and time savings can be made thereby.

Another, major advantage is that the simulation process can be performed fully automatically, the overall result of which is that errors due to, for example, incorrect manual entries can be avoided.

Another major advantage is that simulating will make it possible to compare different architectural principles or constellations at a glance. If, for example, simulating has indicated that the latency time has led to an impermissibly long runtime while the medical-engineering procedure P was being run in the multi-client environment with 5 clients, an immediate check can be made (at a click, so to speak) to determine whether there will be an improvement in the runtime if just a few clients (for example 4) are specified for the multi-client environment. It is furthermore also possible to examine other variations (a different sequence of application steps, a different sequence of applications, different resources on the server, changed resources on the client, different network linking, etc.). As a result of the inventive simulation process it is always indicated how the system's technical parameters will behave under the preset conditions and whether the simulated performance will still be within the permitted range.

An example of a medical-engineering procedure P having a sequence of applications A is described below:
1. Loading a series of images
2. Pause (4 seconds, for example)
3. Enlarging an image in the series of images (1 second)
4. Pause (2 seconds, for example)
5. Medical measurements on an image in the series of images (measuring the volume of a tumor, for instance)
6. Pause (5 seconds, for example)
7. Producing a finding (15 seconds, for example)
8. Closing the series of images and terminating the application.

Another advantage is that no additional requirements are placed on the information-technology fundamentals for performing the simulation. Simulating can be performed on any computer having any platform. Flexibility and variability can furthermore be achieved as regards the values and variables requiring to be simulated thanks to the provisioning of individual modules or, as the case may be, to the inventive system's modular character.

It is hence possible to check in advance whether specific clinical requirements and scenarios can be turned to practical account at all with a given technical infrastructure. So it can be checked in advance whether the performance will be acceptable at all.

It is furthermore possible to compare the simulation results with previous measurements and results and possibly check if the simulation result is at all within a valid range or whether incorrect measurements have possibly been performed. Thus the result that is obtained can be that a multi-client environment having three simultaneously accessing clients is still acceptable while accessing by five parallel clients would lead to a resource bottleneck.

The following parameters can be varied in the simulation:
Number of users (clients that access application A on server S in parallel)
Different workflows (different sequences of applications A)
Different sequences of work steps AS within an application A
Different delay times
Different hardware classes
Different technical conditions (or, as the case may be, parameters) on server S and/or respective clients C of the multi-client environment.

According to an example embodiment variant of the invention it is assumed during simulating that a check will be carried out for each simulation step to determine whether there are sufficient resources (CPU, memory, etc.) on the server to run the application. If there are, then it will be assumed (simulated) that the respective application step will be performed without a delay. It will otherwise (meaning if there are insufficient resources on server S) be assumed during simulating that the respective application step will be delayed so that the response times of server S will increase. It is here advantageously possible still to perform presettings (for example for the exact time duration for increasing the response time).

The following exemplary settings or, as the case may be, presettings are possible for the low hardware class of stage 3.0:
CPU: 2 Quad Core: 100%
Main Memory: 48
Disk Read max: 160 MB/s
Disk Write max: 50 MB/s
Network Send max: 0 Mbit/s
Network Receive max: 0 Mbit/s In a variant of an embodiment of the invention it is possible to preset the manner in which simulating is to be performed. Preferably three simulation configurations are possible here or, as the case may be, can be selected:

Random-based simulating based on a random-based sequence of clients C, number-based simulating where a number of clients running in parallel can be specified, manually configured simulating where the sequence of clients C is based on a manual user input for modeling specific application conditions.

The above description of the invention in conjunction with the example embodiments in conjunction with the drawing is not to be understood as limiting, so that combinations of the features and embodiment variants mentioned and other variants can also be derived by a person skilled in the relevant art without departing from the scope of protection of the application.

Summarizing, embodiments of the present invention can be described by saying that a simulation tool is provided by way of which it is made possible to perform an advance check on a specific technical hardware embodiment of a client-server-based application system in terms of its performance (inter alia its runtime and resource requirements preferably on server S). An application is therein first run on a reference client in a single-client environment with measurement variables therein being measured and registered. Those are then fed to the simulating process and, by way of the simulation algorithm, used for simulating the application's technical behavior in the multi-client environment.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCES

S Server
$S1, S2, S3, \ldots$ Server 1, server 2, server 3, ....
C Client
Ref-C Reference client
$C1, C2, C3$, Client 1, client 2, client 3,
10 Technical resources
11 Hardware resources
12 Measuring device for registering the runtime (performance counter)
13 Resource-specifying device
14 Procedure and application serializer
15 Application-class serializer
16 Property module
17 Method module
18 Hardware-class-determining device
20 Application-step manager
N Network
P Medical-engineering procedure
SIM Simulation module
V Computing module
A Application A1, A2, A3 Application 1, application 2, application 3
AS Application step
AS1, AS2, AS3 Application step 1, application step 2, application step 3

What is claimed is:

1. A method for simulating a performance of a medical-engineering procedure using a plurality of clients operating in parallel in a multi-client environment, the method comprising:
    performing the medical-engineering procedure on a reference client using reference resources in a single-client environment;
    measuring a runtime associated with the performing and registering the reference resources when performing the medical-engineering procedure on the reference client in the single-client environment;
    determining a number of the plurality of clients to utilize in a simulation of the performance of the at least one medical engineering procedure in the multi-client environment; and
    simulating the performance of the at least one medical-engineering procedure on the number of the plurality of clients operating in parallel in the multi-client environment by,
        computing resources of the number of the plurality of clients using the measured runtime associated with the reference client in the single client environment and the reference resources of the single-client environment by adding, in a time interval, the computed resources of each of the number of the plurality of clients,
        determining whether resources on a server are sufficient to perform the medical-engineering procedure in the multi-client environment within the time interval, and
        adjusting the number of the plurality of clients if the resources are not sufficient to perform the medical engineering procedure in the multi-client environment within the time interval.

2. The method of claim 1, wherein simulating the performance includes analyzing one on more of a performance bottleneck and the runtime exceeding a threshold.

3. The method of claim 2, wherein the analyzing includes evaluating which of the resources caused the bottleneck.

4. The method of claim 1, wherein the resources include at least one of CPU capacity utilization; memory requirements; input/output network requirements; input/output disk accesses; graphics-card accesses; and accesses to external applications and/or resources.

5. The method of claim 1, further comprising:
    generating a proposed topology to improve performance of the resources, a data-exchange link between at least one of the plurality of clients and the server, the server, and the plurality of clients.

6. The method of claim 1, further comprising:
    determining which steps of an application associated with the medical-engineering procedure are required to run within the time interval.

7. The method of claim 1, further comprising:
    determining which applications associated with the medical-engineering procedure are required to run within the time interval.

8. The method of claim 1, wherein the simulating is based on at least one of a sequences of steps of an application associated with the medical-engineering procedure and different sequences of applications associated with the medical-engineering procedure.

9. The method of claim 1, wherein:
    a length of the time interval is preconfigurable; and
    the number of the plurality of clients for the multi-client environment is variable.

10. The method of claim 1, further comprising:
    automatically outputting a warning signal if the runtime exceeds a maximum threshold for the runtime.

11. The method of claim 3, wherein the evaluation is a statistical evaluation.

12. A system for simulating a performance of a medical-engineering procedure using a plurality of clients operating in parallel in a multi-client environment, the system comprising:
    a reference client selected from plurality of clients, the reference client configured to perform, during a simulation, the medical-engineering procedure using reference resources in a single-client environment;
    a server configured to perform a server-side of a client-server based application associated with the medical-engineering procedure;
    a measuring device configured to measure a runtime associated with the reference client performing a client-side of the client-server based application in the single-client environment using the reference resources;
    a resource-specifying device configured to register the reference resources while the client-server-based application is being performed by the reference client in the single-client environment;
    a simulation module configured to simulate performance of the at least one medical-engineering procedure on a number of the plurality of clients operating in parallel in the multi-client environment by,
        computing resources of the number of the plurality of clients using the measured runtime and the reference resources of the single-client environment by adding, in a time interval, the computed resources of each of the number of the plurality of clients,
        determining whether resources on the server are sufficient to perform the medical-engineering procedure in the multi-client environment within the time interval, and
        adjusting the number of the plurality of clients if the resources are not sufficient to perform the medical engineering procedure in the multi-client environment within the time interval.

13. The system of claim 12, wherein only an effect of the reference client on the reference resources of the server are registered.

14. A non-transitory computer readable medium including program segments for, when executed on a computer device, causing the computer device to implement the method of claim 1.

* * * * *